United States Patent [19]
Leif

[11] Patent Number: 5,867,800
[45] Date of Patent: Feb. 2, 1999

[54] METHOD AND DEVICE FOR SENSING OF OBSTACLES FOR AN AUTONOMOUS DEVICE

[75] Inventor: Edlund Leif, Uppsala, Sweden

[73] Assignee: Aktiebolaget Electrolux, Stockholm, Sweden

[21] Appl. No.: 718,399

[22] PCT Filed: Mar. 28, 1995

[86] PCT No.: PCT/SE95/00330

§ 371 Date: Sep. 30, 1996

§ 102(e) Date: Sep. 30, 1996

[87] PCT Pub. No.: WO95/26512

PCT Pub. Date: Oct. 5, 1995

[30] Foreign Application Priority Data

Mar. 29, 1994 [SE] Sweden .................................. 9401061

[51] Int. Cl.$^6$ .......................... G06G 07/78; G08G 07/02
[52] U.S. Cl. .............................. 701/23; 701/26; 701/301; 180/167; 340/435; 342/132
[58] Field of Search .................... 701/23, 24, 26, 701/301; 180/167, 169; 340/435, 436; 342/132

[56] References Cited

U.S. PATENT DOCUMENTS

| | | | |
|---|---|---|---|
| 3,969,725 | 7/1976 | Couvillon et al. | 343/6.5 R |
| 4,114,711 | 9/1978 | Wilkins | 180/6.5 |
| 4,620,112 | 10/1986 | McPherson et al. | 307/239 |
| 4,620,285 | 10/1986 | Perdue | 701/23 |
| 4,638,445 | 1/1987 | Mattaboni | 180/168 |
| 4,674,048 | 6/1987 | Okumura | 318/568 |
| 4,700,424 | 10/1987 | Hagen | 15/250.04 |
| 4,815,008 | 3/1989 | Kadonoff et al. | 701/26 |
| 4,887,415 | 12/1989 | Martin | 56/10.2 |
| 5,001,635 | 3/1991 | Yasutomi et al. | 701/26 |
| 5,111,401 | 5/1992 | Everette, Jr. et al. | 180/169 |
| 5,369,347 | 11/1994 | Yoo | 701/23 |
| 5,548,512 | 8/1996 | Quraishi | 180/167 |
| 5,682,313 | 10/1997 | Edlund et al. | 701/23 |
| 5,689,250 | 11/1997 | Kremser | 701/301 |

FOREIGN PATENT DOCUMENTS

| | | |
|---|---|---|
| 0351807 | 1/1990 | European Pat. Off. . |
| 2364002 | 7/1975 | Germany . |
| 313409 | 8/1969 | Sweden . |
| 364574 | 2/1974 | Sweden . |
| 619799 | 10/1980 | Switzerland . |
| 1403860 | 8/1975 | United Kingdom . |

OTHER PUBLICATIONS

James L. Crowley "Position Estimation For An Intelligent Mobile Robot" 14 Feb. 1984, The Robotics Institute, Carnegie–Mellon University, i–ii, 1–23.

*Primary Examiner*—V. Lissi Mojica
*Attorney, Agent, or Firm*—Young & Thompson

[57] ABSTRACT

The present invention provides a method and a system for proximate field orientation of an autonomous device and utilizes a transmitted wave having a first frequency of slow propagation, whereby reflections from obstacles within a proximate area are detected. According to the present invention receivers are arranged in a slanted plane or preferably along a curved base-line to, in a simple way, obtain a three-dimensional direction to an obstacle reflecting the frequency of slow propagation. Additionally, an absorber or a screen or a combination thereof is arranged above at least one receiver to act as an "eyebrow" attenuating undesired reflections which at the receiver come from overhead. Additionally, at least one of the receivers along the generally curved base-line is arranged differently in height in relation to the remaining receivers, and preferably the most outer receiver on each side in the line of receivers along the generally curved base-line is arranged differently in height in relation to the remaining receivers for an improvement of the three-dimensional resolution.

20 Claims, 5 Drawing Sheets

Hypotesis method

FIG. 7(a)

Geometric determination

METHOD AND DEVICE FOR SENSING OF OBSTACLES FOR AN AUTONOMOUS DEVICE

TECHNICAL FIELD

The present invention refers to autonomous devices, for instance in the form of an autonomous and self orientating vacuum cleaner and more exactly to a method and a device for its orientation in the immediate surroundings by means of a sensing system having a transmitter for a wave frequency of a slow propagation and a receiving system having a geometry offering an advantageous sensing and determination of the position and height of an obstacle in the course of the autonomous device.

BACKGROUND OF THE INVENTION

For many years there has been a desire to provide, for instance, an autonomous apparatus for floor treatment, particularly a vacuum cleaner, which is controlled by a sensing system sweeping around the horizon in analogy, for example, with a ship radar. Then the desire is, that the apparatus should be able to orientate itself in a room, such that it, for instance, will be able to perform a cleaning function according to a predetermined pattern or a predetermined strategy and at the same time avoid colliding with different obstacles, which may be arranged in the room, besides avoiding collisions with the walls of the room.

The patent document SE 313,409 from 1969 discloses a device for an independently operating apparatus for floor treatment, which is provided with a pair of wheels driven by an electric motor. This device is characterized in that one of the wheels is automatically releasable against the action of a spring when the apparatus meets an obstacle, whereby the pair of wheels may be turned around a vertical axis, and the moving direction of the apparatus may be changed and additionally the direction of wheel rotation may be switched so that the apparatus in principle can move and avoid the obstacle. Additionally, the device is guided by a controller, which generally guides the travel of the device over the surface to be cleaned.

Also the document SE 364,574 discloses a corresponding device, which on its front side is provided with an obstacle detection device having sensing means-delivering electric signals and by which the width of obstacles, in the course of the device, may be determined. The sensing means operate completely mechanically and preferably consist of microswitches.

In GB 1,403,860, having priority from an 1972 application, is disclosed a process and a device for automatic treatment, e.g., cleaning, of a bounded area, whereby the device will move over the entire area and automatically changing its course at the area boundaries. Anyhow, the device cannot in advance detect other obstacles present within the bounded area and follows in principle a predetermined program to cover all the surface of the bounded area.

Another such apparatus system is further disclosed in the document CH 619,799 from 1973, having priority in an application DE 2,364,002 from 1973. This apparatus, which is driven by two wheels, is arranged with an electro-optical measuring device, which displays several beam inputs and outputs. The measuring device serves to measure the distances between the apparatus and measuring points on the walls limiting the room. The measured points are entered into a coordinate calculation processor, which calculates, correlates and controls, respectively, the coordinates of the measuring points and stores these calculated values in an orientation memory. By means of a path counter connected to the wheels the motion of the apparatus is additionally calculated and the apparatus is guided by means of this information to by itself systematically travel over the entire surface of the floor for cleaning that surface.

A drawback here is the difficulty to locate obstacles which may be present in the course of the apparatus in its travels over the floor as an electro-optical sensing system which, due to the high propagation speed, demands a measuring system capable of measuring very short time periods, why, first of all, such a system, even still with the recent development taken place within electronics and computer technique, will be so expensive that it above all from the point of price level cannot be made available to the public. Thus, it is still technically seen difficult with such an electro-optical method to measure short distances with a satisfactory resolution. Additionally, if an obstacle exhibits a smooth angled surface, such an electro-optical sensing pulse may well be reflected in such a direction, that the reflected signal never will be apprehended by the receiver and thereby no indication of the obstacle will be obtained, why the apparatus will soon collide with such an obstacle in its travel.

In an document from 1984 by James L. Crowley having the title "Position Estimation for Intelligent Mobile Robot", The Laboratory for Household Robotics, Carnegie-Mellon University, a solution of the problem to maintain an estimate of the position of the robot, when it travels in either a known or unknown environment, is further described. The document additionally gives a number of further references to different algorithms used for modelling in this context and which may be used to program a dataprocessor for the guiding of such a robot. An apparatus demonstrated in the document utilizes in part encoders at the robot's wheels to determine its travel and in part a rotating sensor sensing the distance to exterior surfaces having a beam with a starting diameter of approximately 7.5 cm and a beam spread of about 3°. The sensor rotates at about 1 revolution per 5 seconds and returns the distance to the nearest surface within 6 m to a resolution of 3 cm. The apparatus may then be placed into a learning mode during a guided tour of the world where it is supposed to act. Starting from the learn mode the apparatus will then from some starting point by itself orientate in this now explored environment.

In U.S. Pat. No. 4,674,048 having priority from JP 200360/83 is disclosed a guiding system for a moving robot, which calculates its momentary position and sequentially stores data of the obtained positions and which information then is used for the continuing travel of the robot. The robot then calculates a travel pattern within a specified area, whereby it is allowed to travel within the range without leaving any region untravelled and taking notice of possible obstructions which alters its course. Besides the robot compensates position errors due to slippage of its drive wheels or errors in the operation of its motors.

There are additionally a multitude of other documents like for example U.S. Pat. Nos. 4,114,711 (1978), 4,700,424 (1987), 4,887,415 (1989) which also disclose different arrangements in automatically guided autonomous machines.

Another document from 1987, U.S. Pat. No. 4,638,445 discloses a vision system for a mobile robot which employs at least two arrays of sensors for obtaining data on the position and distance to objects in a workspace. One sensor array looking downwards is used principally to see near objects and the other array is used principally to see far objects. The device utilizes ultrasonic transducers which then operate as monostatic sensors. The system sketched demands a fairly large and even high device not suitable for an autonomous apparatus for floor treatment, particularly a vacuum cleaner.

Finally a recent document U.S. Pat. No. 5,111,401 issued 1992 discloses a navigational control system to direct an autonomous vehicle to travel along a floor from a first location to a destination within an environment. The vehicle relies on at least one reflective encoded stripe applied to the floor. The navigation also relies on a separately installed host computer via a wireless link, which together with a local processor in the vehicle guides the vehicle.

Common to all these previous designs is that those because of the multitude of differently combined methods needed for their orientation and steering most often will be of a clumsy size and above all they are utterly complicated and expensive to produce.

Therefore there is a desire to provide a method which may be applied in a system of an autonomous device, which by way of this method still will be possible to manufacture at reasonable production costs, such that a ready-made product, for instance, for automatic vacuum cleaning of a room will be provided at a total price, which makes the product available to the public.

SUMMARY OF THE INVENTION

According to the present invention a proximity sensing method and system is provided for an autonomous device, the device comprising a microprocessor system and a sensing system having transmitter means and receiver means utilizing a transmitted wave of relatively slow propagation, whereby reflections within a proximity area are detected by means of a particular receiver system, being interfaced to the microprocessor for the frequency of said wave of slow propagation.

According to a first object of the present invention the receiving means are positioned in a line along a curved base-line to in a simple way obtain a three-dimensional direction to an obstacle which reflects the wave of slow propagation.

According to a second object of the present invention an absorbing means or a reflector or a combination of those is arranged above at least one receiving means, whereby this acts as an "eyebrow" which at the receiving means attenuates the reception of reflections from undesired directions.

According to a third object of the present invention one of the receiving means along the generally curved base-line is additionally positioned differently in height compared to the rest of the receiving means and preferably the most outward receiving means on each side in the row of receiving means along the generally curved base-line are positioned differently in height in relation to the remaining receiving means.

According to an additional object of the present invention the wave for sensing obstacles proximate to the device constitutes a regularly transmitted swept (chirped) signal on the frequency with relatively slow propagation, which signal thus is repeated in a predetermined interval, whereby the wave of relatively slow propagation is comprises a longitudinal wave and primarily an acoustic frequency within the ultrasound range (supersonic range).

According to an additional object of the present invention the receiving means along the curved base-line comprises separated microphone members adapted to this wave frequency and arranged to produce a suitable digital signal to the microprocessor in the autonomous device.

DESCRIPTION OF THE DRAWINGS

The invention will be described in form of a preferred embodiment by making reference to the accompanying drawings, in which.

AN ILLUSTRATIVE PREFERRED EMBODIMENT

General Description

Figure 1:
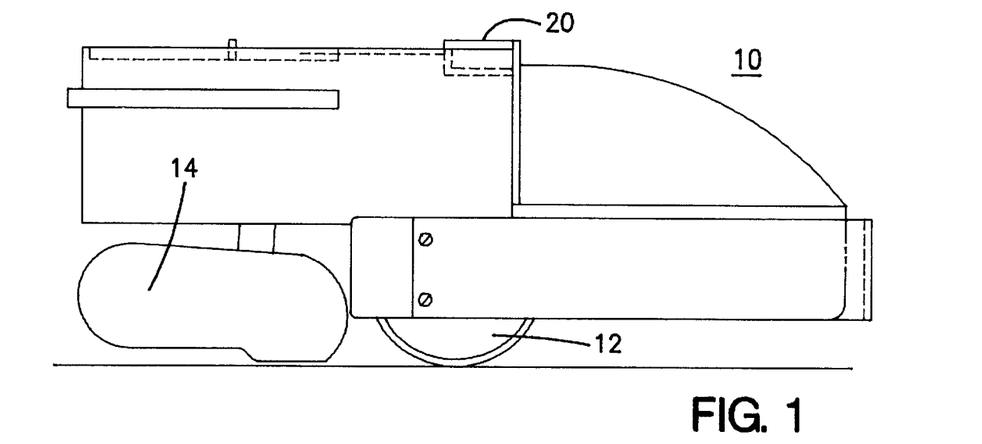
FIG. 1 demonstrates a side view of an autonomous device in an embodiment as a vacuum cleaning robot according to the present invention.
Figure 2:
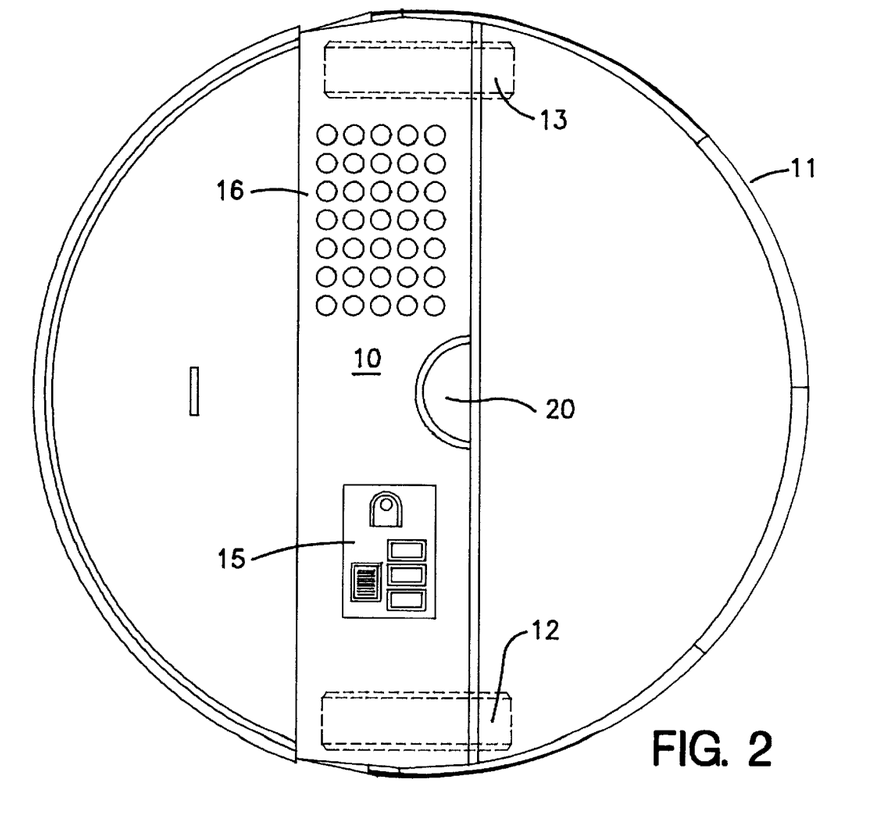
FIG. 2 demonstrates a plan view of the vacuum cleaning robot of FIG. 1.

In FIG. 1, in a right side view, and in FIG. 2, in a plane top view, is disclosed an illustrative embodiment of an autonomous vacuum cleaner 10, which applies the method and the system of the present invention. The vacuum cleaner 10 comprises in principle a circular housing 11 provided with two driven wheels 12 and 13. On the housing 11 there is a control panel 15 provided with controls and indications for the device according to the state of the art, as well as an outlet of air from the vacuum cleaning unit 14 of the device.

Figure 3:
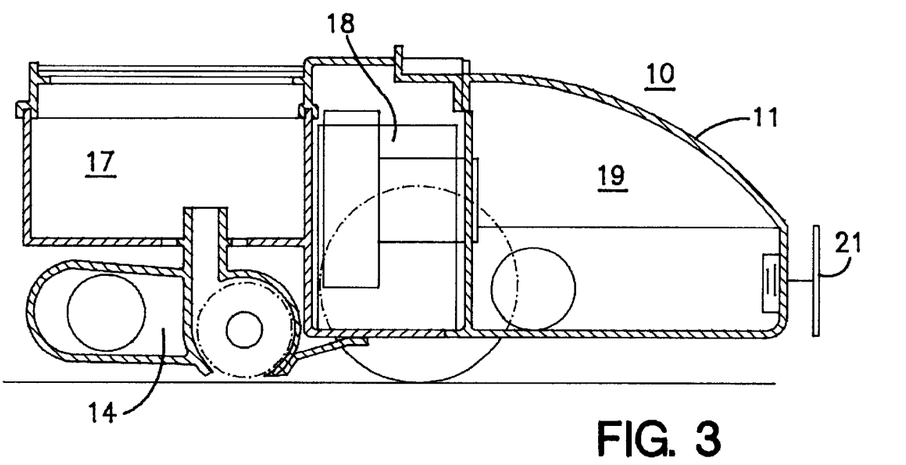
FIG. 3 demonstrates an elevated cross section view of the vacuum cleaning robot of FIG. 1.

FIG. 3, in simplified picture demonstrating a cross section of the vacuum cleaner 10, shows that the housing 11 in principle comprises 3 compartments, a back compartment 17 for collection of dust above the vacuum cleaning unit 14, a central compartment 18 for instance for heavier components like accumulator battery and driving motors, and a front compartment 19 for the remaining equipment, for example a microprocessor and associated printed circuit boards and electronics for the transmitter and receiver for the orientation and for the guidance of the vacuum cleaner during its operation. As is also seen in FIG. 3 the housing 11 additionally at its forward edge, in a common manner, is provided with a mechanical sensor 21 for the case it should collide with some obstacle not detected in advance. In another embodiment the entire housing of the compartment 19 (FIG. 3) constitutes a mechanical sensor being movable in the x and y coordinates to also sense obstacles higher up, e.g., when the vacuum cleaner goes in under a sofa or the corresponding. Up on the top of the housing 11 is placed an ultrasonic transmitter 20 which, together with a number of ultrasonic microphones, is used for the detection of obstacles in the course of the vacuum cleaner. In an illustrative embodiment the ultrasonic transmitter is a cylinder having a diameter of about 15 mm, which sticks up about 20 mm above the housing 11, and on top is provided with a sound absorbing plate on which then additionally is placed an IR receiver. Thus, in this embodiment the housing 11, the ultrasonic transmitter 20 and the mechanical sensing 21 constitute an integrated unit.

Figure 4:
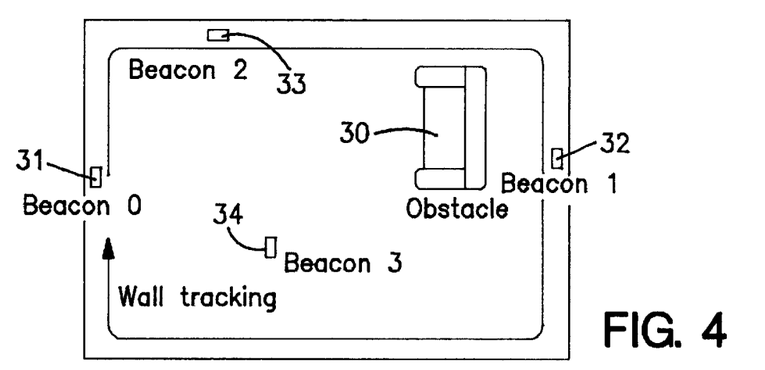
FIG. 4 shows a room provided with a number of active beacons or transponders and where the vacuum cleaning robot of FIG. 1 has to orientate by means of a first encircling along the walls of the room.
Figure 5:
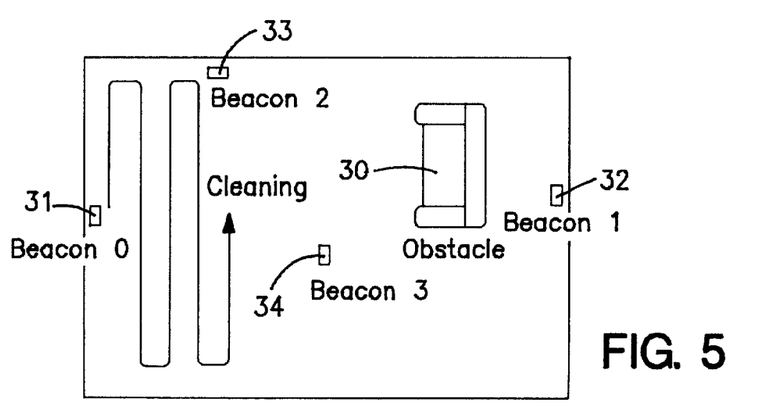
FIG. 5 shows the way the vacuum cleaning robot according to FIG. 1 in principle will do its cleaning action after having explored the room.

In FIGS. 4 and 5 the principle is demonstrated of the way the vacuum cleaner performs an automatic cleaning of a room. In the room of the example shown there is, for instance, a sofa 30 and the room is further in this case provided with four transponders 31–34 for the orientation of the vacuum cleaner. In this example all of the transponders are within the area to be cleaned, but it should be noted that a transponder very well may be positioned out of the bounded cleaning area. When the vacuum cleaner is to perform an automatic cleaning of the room it starts in a traditional way to at first make one full round around the room with wall tracking, along the walls limiting the room, starting from transponder 31 or "beacon 0". The wall being tracked during a wall tracking is all the time registered by means of the ultrasonic device, and will thus all the time be present on the left side of the apparatus when the apparatus is making a right hand round. Additionally the transponders 31–34 are registered by means of a system in which the transponders are active and respond when the transponders have registered a transmitted ultrasonic pulse from the apparatus. In the illustrative embodiment such a sound pulse, alternatively a swept pulse (chirp pulse) is transmitted every hundred milliseconds during that the apparatus at the same time is moving along the wall. It should be noted that in an embodiment using a chirp signal it is of course possible to lengthen that such that an altogether continuous signal is generated instead of distinct pulses. The same ultrasonic transmitter, in practice in the illustrative embodiment, is used both for the proximity orientation and for the communication with the transponders. By means of the responses from the transponders and the motion along the wall the microprocessor then builds up a kind of an image of the room, where the exact positions of the transponders will be better and better determined the longer the apparatus is travelling during this orientation round, and at the same time it is performing a cleaning function along the path covered. During this round the sofa 30 in the demonstrated example will also be registered by the ultrasonic device and will be placed into the "map" of the room generated. This map is successively further filled in when the room is vacuum cleaned.

After one turn around the room has been completed the vacuum cleaner is prepared to by it self perform its automatic cleaning of the remaining surface of the room, which is illustrated in FIG. 5. The microprocessor then calculates a motion pattern such that the entire surface will be covered by the apparatus and at the same time with a suitable small overlapping. During this operation function the device now will utilize the "map image" and verify the travel of the apparatus by comparisons with the positions of the transponders and by means of covered path registered by the wheels. By separate driving motors of the wheels 12 and 13 and their position the apparatus may comfortably be rotated around its symmetry point, which then is the origin of the circle constituting the limiting line of the housing 11. The driving motors in an illustrative embodiment are for example step motors having the designation KH56HM2-501 from Japan Servo Co LTD.

Simultaneously as the apparatus is moving the ultrasonic system performs a proximity area sensing within a range 0–40 cm to detect possible obstacles, which by some reason are not noted in the previously generated mapping image and which are not possible to be driven over by the apparatus. Due to the low height of the apparatus is can for instance also vacuum clean underneath a table or a chair, whereby it only has to avoid their legs. When the apparatus has registered an obstacle it first turns around and continues the surface cleaning of all open surfaces. Thereafter cleaning is performed around obstacles by, for instance, making a full turn around the obstacle, if this is possible, before it continues to the next obstacle. After completed cleaning the robot returns to the starting position for charging.

Thus with this generally described system a vacuum cleaner or "dust robot" is obtained, which by itself with a starting position from a point in a room automatically is capable of performing a vacuum cleaning of the room after it received a command for this. In the illustrative embodiment the "beacon 0" constitutes a docking point for the device, where it normally is in idle and may then recharge its built-in accumulator and where it may return for additional charging if the apparatus from a previous charging of the accumulator is unable to complete a vacuum cleaning of the entire room. The transponders 31–34 additionally are, in this case, of an active type, which has an own power supply, either by means of a battery or by for example being connected to available power outlets, which in the described embodiment is applicable for the docking transponder 31 to obtain charging current for the accumulator. In FIGS. 4, 5, 6 and 8 the transponder 34 is typically self supporting by means of a battery, while transponders 32 and 33 like the docking transponder 31 are connected to available power outlets. The transponders 32 and 33 remind in appearance of small lamp devices which sometimes are inserted into power outlets to in dark generate guiding light. Thus, in principle, regarding the height above floor, the transponders may be placed freely and the only one which by necessity must be present on a wall and at the floor will be the starting and docking transponder 31. Anyhow, according to the preferred embodiment the height of a transponder is for instance limited to 1 m above the floor to be able to reduce radiation upwards from the ultrasonic transmitter and thereby reducing the number of unwanted reflections from above which contribute to the general noise background.

Here as an illustrative embodiment a vacuum cleaner has been described, but the invention is of course applicable to any autonomous robot, for instance, for any other kind of cleaning function, e.g., like floor polishing.

Short Description of the Orientation Function

Figure 6:
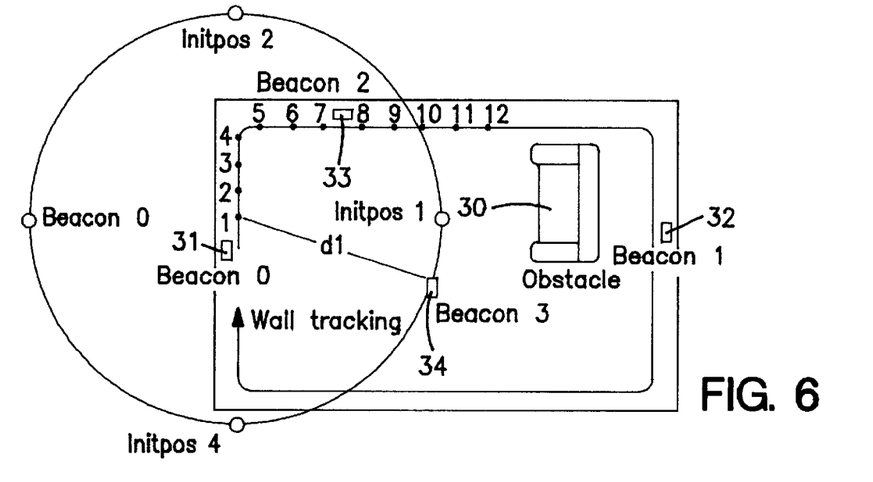
FIG. 6 demonstrates a generally basic picture for estimation of the position of a transponder by means of a built-in sensing function.

For the orientation function an orientation device POM (POsition Manager) is used, which additionally comprises a number of subroutines for the microprocessor of the device to in part guide the robot each 20th milliseconds and in part for positioning. At the start of a wall tracking the position of all the transponders is unknown except for transponder 31, i.e., the "beacon 0", which is used as starting point for the orientation and thus constitutes origin in its own coordinate system. In FIG. 6 is shown a starting position where a sound pulse is registered by "beacon 3", i.e., transponder 34. The time, e.g., for an ultrasonic pulse to propagate from an ultrasonic transmitter 20 of the vacuum cleaner 10 to the transponder 34 gives a measure of the distance to the transponder. The transponder in turn acknowledges that it has detected the ultrasonic pulse by means of transmitting back on another frequency, e.g., a light pulse or a radio wave pulse, to a receiver on the vacuum cleaner. The time for this electromagnetic wave to propagate back is comparatively negligible and deduced from the time period from that the pulse was transmitted until it was detected by the transponder the distance $d_1$ to the transponder is achieved. It is then obvious that the transponder is situated somewhere along a circle having its origin at the transmitter 20 and a radius equal to $d_1$.

Figure 7A:
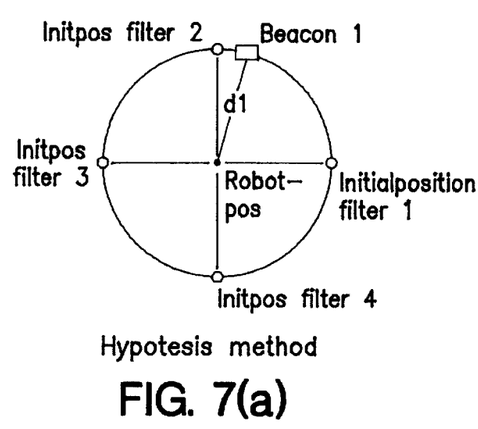
FIG. 7 shows in part estimation of the position of a transponder by means of an hypothesis method and in part by means of a geometric path estimation.
Figure 7B:
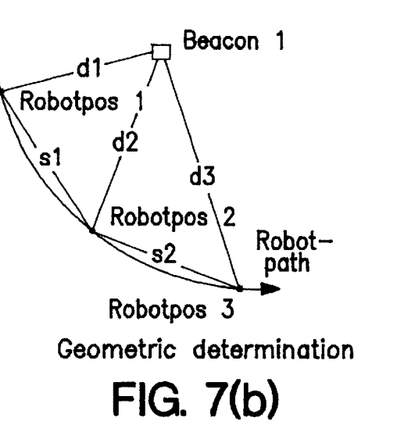
Figure 8:
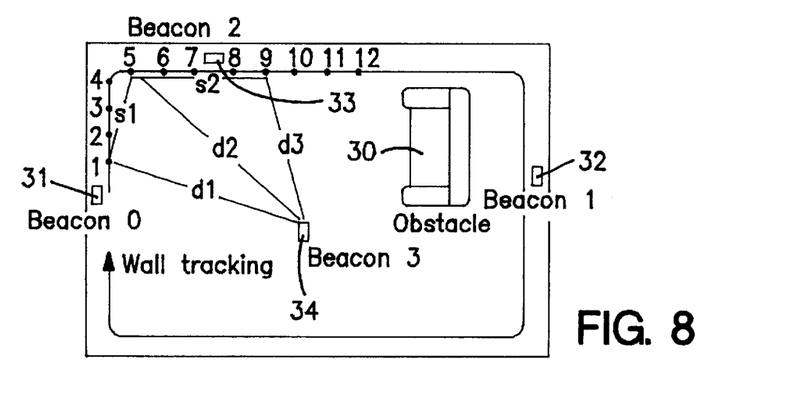
FIG. 8 shows orientation towards a transponder during a first encircling of the room.

Now one method of positioning the transponder is by means of the hypothesis method. The hypothesis method, which is sketched in FIG. 7, means that for each transponder try a number of, for instance, 4 parallel Kalman filters. (A complete description of the Kalman equations may for example be found in A. Gelb "Applied Optimal Estimation", MIT Press, 1975 and H. Sorenson "Kalman Filtering: Theory an Application", IEEE Press, 1985). Also other types of filters may of course be applicable. Thus, this corresponds, in FIG. 7, to four different hypotheses, of which one gradually will be chosen. When the transponder distance $d_1$ is achieved the initial position of the transponder in the respective filter are assigned $(x_{robot}+d_1, y_{robot})$, $(x_{robot}, y_{robot}+d_1)$, $(x_{robot}, y_{robot}-d_1)$ and $(x_{robot}-d_1, y_{robot})$. If no filter converged all hypotheses are rejected and the method is repeated. After finding a "best estimate" this value may be used in a new calculation set where all collected values are again used, but in reversed order. The result then obtained has a higher accuracy than the first one obtained.

Another method of positioning the transponder may be performed by geometrical path determination. Even this method is sketched in FIG. 7 as well as in FIG. 8 and works like that the robot has travelled so far that two "legs" $s_1$ and $s_2$ may be generated which together with the transponder distances $d_1$, $d_2$ and $d_3$ form the basis for a trigonometric calculation of the transponder position. The course determination then preferably forms initial value to the Kalman filter. To obtain a sufficient accuracy the method demands that $s_1$ and $s_2$ are of enough length and intersect with a certain minimum angle. The method is in part prolix, as all measured transponder distances between positions 1 and 2 must be stored (they will be filtered afterwards when the initial value finally has been determined). Besides certain geometries combined with an unfavorable furnishing may imply that the transponder only is visible occasionally, which may signify that two "legs" are never generated.

A positioning of one transponder 34 is illustrated in FIG. 6, whereby a sequence must be run through for each transponder being detected. The principal elements of such a sequence is, for example, as below:

a) The robot moves from the transponder 31 and obtains the distance to the transponder 34. The first measurement $d_1$ is obtained at sample 1.

b) Now a filter program in the microprocessor is started, in the Figure with four Kalman filters (in the illustrative embodiment in reality 12). The initial position of each filter is uniformly distributed on a circle of radius $d_1$.

c) Each new sample is input to respective filter. In the FIG. 4 filters are operated in parallel with the same data (samples 1, 2, 3, . . . ).

d) Samples 1, 2, 3, . . . (the transponder distances) are stored together with the robot position. Those will be used later for a repeated filtering of the best hypothesis.

e) The filtering goes on until a filter in part has built up (reached a given accuracy) and in part has converged, i.e., that the residue of the difference between the expected and measured transponder distance falls below a given value.

f) The result of the best hypothesis is checked regarding likelihood. Thereafter a refiltering takes place with the output data of the best hypothesis as initial value of the transponder, which gives a better accuracy. Finally the transponder position is transferred to the navigational portion (for example in form of a map image) and is used for positioning of the robot.

When the robot completed one full turn around the room the positions of all transponders in the illustrative embodiment are to a good accuracy put into a "map image" which is limited by the walls of the room, and are also put in possible other obstacles, which the ultrasonic system for the proximity range did discover during this go-around. After this the robot start its cleaning function by in its map image follow a calculated pattern to cover the entire surface of the room.

This motion pattern follows a path which is generated by a course generating module and is divided into a number of segments. These segments are either straight lines or arcs. In path tracking three coordinate systems are used:

one fixed room coordinate system which covers the room and with its origin at the first reference transponder, one vehicle fixed coordinate system with its origin at the vehicle reference point, i.e. preferably in its center, and one segment fixed coordinate system; which gives the position of the segment driven in the room.

All calculations are implemented in the illustrative embodiment using integer arithmetics, whereby scaling is applied according to the table below. By "scaling" is meant the value of the least significant bit, while "length of word" means the number of bits used to represent the quantity.

| Quantity | Scaling | Length of word |
| --- | --- | --- |
| Distance | 1 mm | 16 |
| Angle | 90°/1024 | 16 |
| Position | 1 mm | 16 |
| Time | 1 ms | 32 |

In a preferred embodiment of the method and system of the present invention is consequently used the same ultrasonic pulse for sensing of a proximate area in front of the robot by means of a number of receiving means being distributed on the forward case of the vacuum cleaner 10 for receiving the reflected ultra sound. Each such receiving means then operates within a time slot, which, for instance, after transmission of the ultrasonic pulse corresponds to an immediate proximate area and serves to discover additional obstacles, which were not discovered during the first exploring round around the room. Additionally at least one of these receiving means is used to control the vicinity of the wall at the left side in the first exploring right hand round. When the ultrasonic radar has discovered an obstacle, for which there is a danger of hitting, for instance, the robot of the illustrative embodiment decreases its velocity from 0.4 m/s to, for example, 0.1 m/s. At this velocity the mechanical sensor 21 may hit the obstacle and there will still be time to stop the robot within the resilient distance of the mechanical sensor.

Detailed Description of the Proximity Sensing System

The proximity sensing system in the illustrative preferred embodiment is built up as an ultrasonic radar having one transmitting member and 5 receiving means in the form of microphone elements. In other words the present device operates as a coherent bi-static radar, contrary to other devices operated with several simultaneous monostatic non-coherent sensing systems. The microprocessor determines the time for the transmission of an ultrasonic pulse. The pulse length is determined by the signal processor, which excites the transmitting member to one or several periods at 35 kHz. The next pulse or swept pulse (chirp signal) is transmitted after about 100 milliseconds. This time period corresponds to a complete ultrasonic radar cycle, which means that before the next pulse is transmitted the positions of possible targets should be calculated and reported.

The microphone signals are each sampled with 40 kHz after amplitude demodulation of the received signal. The number of samples per channel is limited to 200. This corresponds to the time period of 5 milliseconds or an acoustic propagation path of 170 cm if the sound velocity is assigned 340 m/s.

Figure 9:
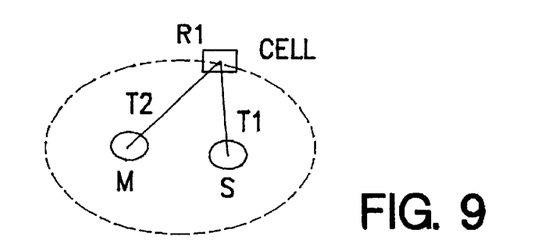
FIG. 9 demonstrates a sensing principle having a separate transmitter and receiver and different propagation times between transmitter and a target and between the target and the receiver.

Detection of each microphone signal is done separately. The time of a detection corresponds according to FIG. 9 the propagation time T1+T2 from a transmitting element to a microphone M via a reflection point R1, which thus corresponds to the propagation path. T1 corresponds to the propagation time of the signal from the transmitter S to the reflection point R1 and T2 the propagation time of the signal from the reflection point R1 to the receiver M. This propagation geometry is for each channel equivalent to an ellipse having the transmitter and the receiver in the respective focal points of the ellipse and the target on the ellipse in relation to the position of a transponder, in full analogy with FIG. 6. With different locations of the receivers, different such ellipses are obtained, which intersect each other in the point R1.

Figure 10A:
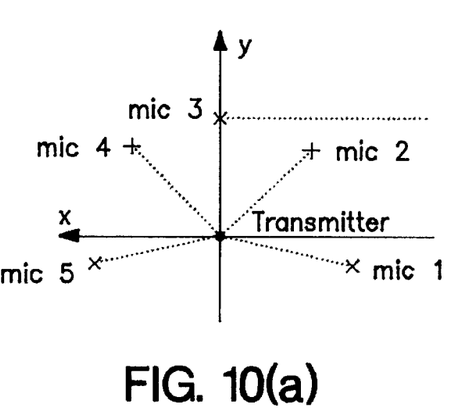
FIG. 10 shows geometrically a relation between a transmitter a number of receivers according to a preferred embodiment of the present invention.
Figure 10B:
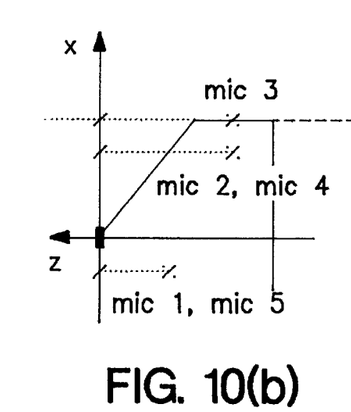

To establish a direction (x, y, z) to a detectable object several microphones are utilized. In FIG. 10 is demonstrated, for the illustrative embodiment, a suitable geometry for the location of the transmitting element and the microphone elements onto the mobile vehicle, in part in a top view and in part in an elevated side view. The coordinate system of the figure is the one utilized for the calculation of target positions. The target position is given to the navigational function with an x and y coordinate. Totally 200 targets may be reported.

The algorithm for target detection implies that rising flank is detected in the received signal. One sample is compared to a signal level which is created by a floating threshold and a fixed marginal. If the sample exceeds this detection level a detection is made and the sample is set to 1, otherwise to 0. The floating threshold is a low pass filtering of the signal.

Figure 11:
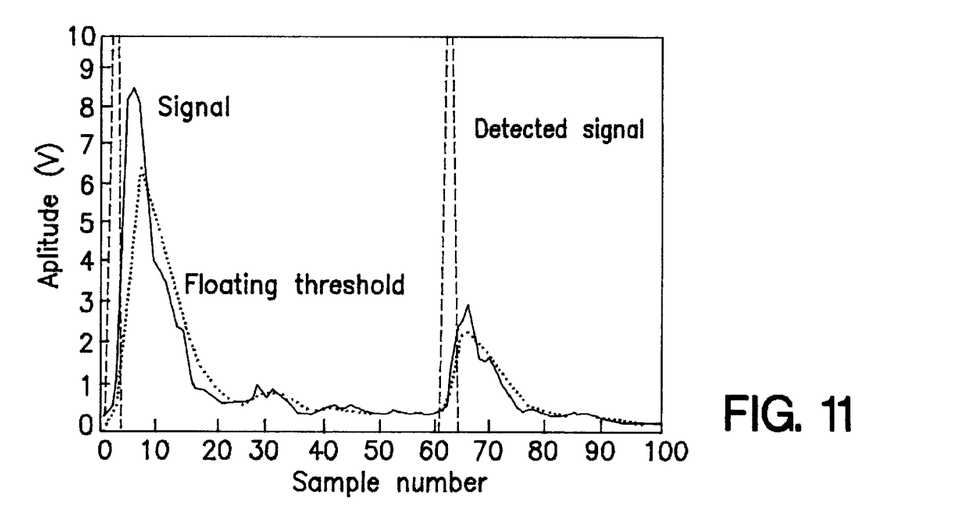
FIG. 11 shows a typically received signal, a floating threshold and a signal detected by one of the microphones.

FIG. 11 demonstrates an example of the appearance the received signal may have for one channel. Except the received level, drawn by a solid line, the Figure also shows, by means of a dotted line, the created threshold level. Detections are marked with a dashed line. The first detection originates from a direct path from the transmitting element to the microphone element and the second originates from a target reflection. The reason for a floating threshold is the desire to avoid detecting ringing present in the pulse. In addition this setting of a threshold implies that differences in amplitude levels between channels lack importance as long as the variation of the amplitude versus time is behaving in a similar manner.

When a sample is detected also the previous sample is set to "one". In FIG. 11, for example, if a detection is made at sample 63, then samples 62 and 63 are set to "one". In this way a detection corresponds to two samples which make positioning more robust. When a target echo finally has been detected the solid signal level shown in FIG. 11 must drop below the dotted threshold level before additional detections are permitted.

After the detection the signal vectors consist of "ones" and "zeros", whereby "ones" correspond to detections. Each detection correspond to a time. This time, according to FIG. 9, corresponds to a position lying on an ellipse having the transmitter S and the receiver M in the respective focal points of the ellipse.

By calculating intersections between ellipses from the five channels the position of a target may be estimated. However this calculation is demanding. The positioning may be performed in a more simple way. The demand on the ultrasonic radar is that it should detect and position targets within an area in front of and to the side of the robot. This area is defined and indicated by limits in the x and y directions.

Figure 12A:
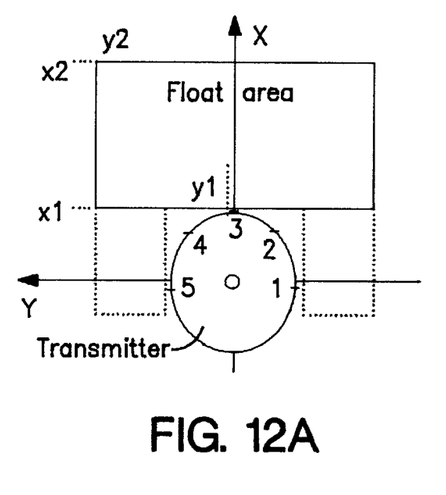
FIGS. 12a–12b demonstrate in an illustrative embodiment a division of viewing areas of the robot, the front area concerning the rectangle in the forward direction and the side areas concerning the rectangles positioned an the right and left side of the robot.
Figure 12B:
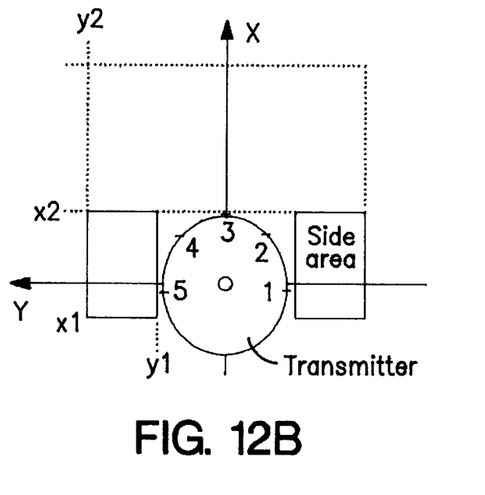

In FIGS. 12a and 12b are shown an area division of the illustrative preferred embodiment comprising one front area and one left and one right side area. Each such area is then divided into a squared point screen of possible target positions. In the program code the distance between these points are given. The resolution of the screen is arbitrary chosen the same in the x and y directions. In all the points a decision is taken whether or not a target exists. In the same manner as the front area is stretched by four constants in FIG. 12a, the side areas are also stretched by four constants in FIG. 12b. To demonstrate the operation of the algorithm FIG. 13 demonstrates one of the screen points of FIG. 12a.

Figure 13:
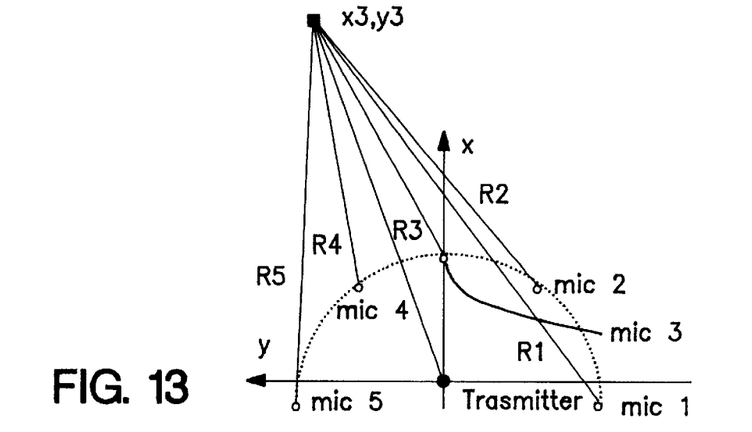
FIG. 13 demonstrates the way of performing calculation of the distance from a point to all of the microphone elements, whereby the number of microphones being used is dependent on decisions taken by the navigational function, and FIG. 14 demonstrates the geometry to calculate compensation of the height difference between the transmitter member and a microphone.

FIG. 13 shows the appearance of the geometry as seen from above, for instance, for the screen point x3, y3. In this basic consideration it is assumed that a though target is a cylinder, which results in that a reflection will always be expected. For other targets geometries could be expected, where there will be a risk that a reflected longitudinal wave front not always will return to the receiver, for example, by extinction between simultaneously reflected waves from two surfaces of the object. The position of the selected point is known, which leads to, in FIG. 13, that the distance Rs to the transmitter is calculated.

The positions of the microphones are also known and given into the program code as constants, which implies that R1 to R5 may be calculated if this is desired. By adding Rs to R1–R5 five distances are obtained.

Figure 14:
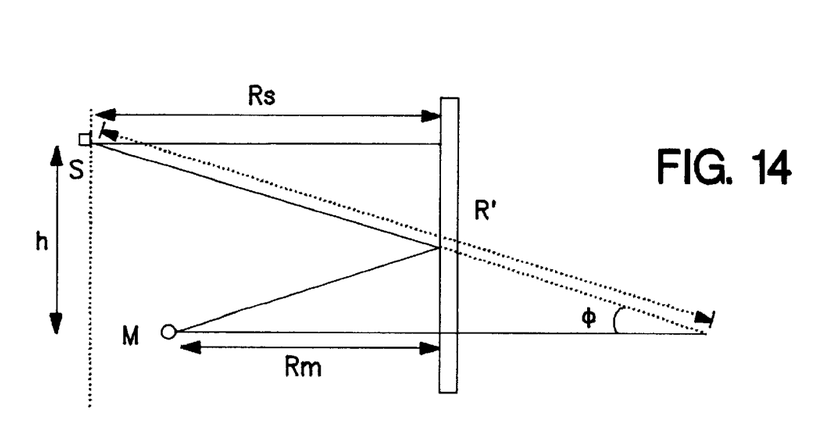

To obtain the correct sample number the distance must be compensated due to difference in height between transmitter and receiver, whereby FIG. 14 demonstrates one example of geometry.

The real propagation path R' is given by the formula $$R' = \frac{R}{\cos\left(\arctan\left(\frac{h}{R}\right)\right)}$$

where R' is the real propagation path including height compensation, h is the height between the transmitter element and the microphone element and R is equal to Rs+Rm and m=1, 2, 3, 4, 5.

The expression above is in the implementation approximated by a polynomial of the second order according to established technique, one for each channel. Each distance corresponds to a sample number in one of the signal vectors stored after detection. The propagation path is converted into a sample number for the actual microphone by the formula $$N_s = \frac{R'}{v} f_s$$

where $N_s$ is the sample number, R' the geometrical distance, v the sound velocity and $f_s$ the sampling frequency.

Also compensation must be included for the delays in the receiver channels: $N=N_s+N_d$, where N is the real sample, $N_s$ the is calculated sample number and $N_d$ is the measured delay.

As a condition, whether or not the cell contains a target, is stated how many of the observed channels which have to contain a detection just for the sample corresponding to the cell contemplated. The number of microphones which being regarded in the example is selectable between 1 and 5 and is selected by the navigational function.

The algorithm goes on to the next calculation point if the condition is met (target detected) or as soon as it is found that the condition is not possible to fulfill (target not detected). After that the forward direction has been investigated in the example with maximum 5 microphones, the side area is investigated using maximum 3 microphones.

For calculation of sample number as above the symmetry being present between the right and left half planes is utilized. It is sufficient to calculate sample number for the left half plane as the right half plane will give the same sample number for a corresponding cell and microphone.

The target positions are stored and on request transferred to the navigational function.

In order for the radar algorithm to be able to produce relevant data a number of constants must be given a value, i.e., initializing the current subroutine for the microprocessor of the robot. The following input data must be present when the radar algorithm should start operating:

Microphone positions in relation to the transmitter, which is supposed to sit at the origin (0, 0, 0). (Not necessarily the origin of the robot). The z coordinates of the microphone positions are implemented as a correction polynomial in the calculation of sample number.

Which area is contemplated.

Resolution of the contemplated area.

Measured time delay.

Conversion of distance—sample.

Measured Data:

Sample vector from available channels (for instance 5).

The following parameters are controlled from the navigational function:

Number of microphones used in the proximity sensing of the forward direction (in the example maximum 5).

Demand for lowest number of channels which have to contain detection for the current cell in the forward direction.

Marginal for detection.

Number of microphones used for proximity sensing of the side area.

Demand for lowest number of channels which have to contain detection for the current cell in the side area.

The following output data will be obtained:

Target position in coordinates x, y and z. Maximum 200 targets may be reported from one pulse sweep (Limited by the performance of the signal processor). Transfer takes place after initialization from the navigational function.

In accordance to the invention by preferably placing the microphones in a slanted plane or along a suitably curved base-line also an information of the height of the target is obtained by comparison of the propagation paths, as the paths measured from all the microphones indicating echo from the target concerned must agree with the estimated position of the target. The curved base-line of the illustrative embodiment is determined in a natural way by the circular form of the robot. Of course this surface containing the microphones may at the same time even be designed slanted. Thus by introducing a height for the target and correct the propagation paths for this, a height is then obtained for which all measured distances at each receiving means or microphone agree, whereby, except the distance to the target, thus is also obtained an idea whether the target happens to be above the surface traversed by the robot. This height resolution is further improved by placing at least one receiving means differently in height relative to the rest. In a preferred embodiment, for example, the microphones 1 and 5, respectively (FIG. 13) are placed higher than the rest of the microphones 2, 3, and 4.

In the illustrative embodiment the proximity sensing device "sees" obstacles within about 200° of a forward directed circular sector of a radius 40 cm, which for the proximity sensing corresponds to a reception time of 3 milliseconds after a transmitted sound pulse. This further implies that the processor system has another 97 milliseconds for processing and interpretating and storing of data before the next ultrasonic pulse is transmitted. Additionally the previously mentioned transponders also wait a certain time period before sending their responds by means of, e.g., an IR signal, why the processor system may utilize of the order 40 milliseconds after an ultrasonic pulse for further processing of data for the proximity sensing system before signals from the transponders start to emerge. In other words, the responses of the transponders will reach a receiving means for that signal frequency between 40 and 95 milliseconds after a transmitted sound pulse being detected by a transponder. The receiver means for this response in the illustrative embodiment is placed on top of the ultrasonic radar transmitter element 20 (FIG. 1). The resolution of proximity sensing distance to an object by means of the algorithms used for the ultra sound do have the objective of being better than 5 mm.

Additionally the proximity sensing device is provided with an absorber or a screen over at least one receiving means in the row of receiving means, whereby the absorber or screen attenuates undesired reflections from above and/or from the side and operates as an eyebrow over the receiving means. This absorber or screen in an illustrative embodiment is simply a small plate placed over the receiving means to limit its sight upwardly. Whether this plate operates as an absorber or a screen will be a function primarily of the material out of which the plate is manufactured. This device is essential for example when the robot passes underneath a furniture, the height of which exactly permitting the robot to pass underneath the furniture, whereby echoes will occur within the direct close neighborhood of the robot, and which echoes otherwise then would be difficult to exactly position. According to what already has been mentioned, the robot decreases its velocity, when it discovers objects which may signify risk of collision. In this case it is not absolutely necessary to perform a velocity decrease in spite of echoes being present within the critical range. Due to the receiver provided with an eyebrow will give another echo appearance, the processor than will be able to decide that the echoes are coming from a surface above the robot, as the normal height resolution operates primarily for echoes coming within a sector in front of the robot.

To further improve the proximity sensing, its receiver means are provided with a signal attenuating possibility, for instance −20 dB, which is switched in when echoes from proximately positioned targets become so strong that the receiving means run the risk of being saturated.

It will be understood by those skilled in the art that various modifications and changes may be made to the present invention without departure from the spirit and scope thereof, which is defined by the appended claims.

What is claimed is:

1. A method for sensing proximity for an autonomous device, said autonomous device including wheels, a motor, and a microprocessor and proximity sensing system for orientation and guidance of said autonomous device, said proximity sensing system including a transmitter and receivers, said receivers having signal interfaces for transmitting digital signals to said microprocessor and being arranged in one of a slanted plane and along a curved baseline, comprising the steps of:

transmitting a wave from said transmitter, said wave having a slow propagation and being transmitted within a continuous sector of a normal travelling direction of said autonomous device;

detecting reflections of said wave by a number of said receivers during a predetermined time slot, corresponding to a proximate area, thereby obtaining a three-dimensional direction to an obstacle;

a transmitting digital signals from said number of said receivers to said microprocessor in response to said detecting;

processing said digital signals by said microprocessor and creating an orientation data base within said proximate area;

utilizing said data base continuously for orientation and guidance of said autonomous device with respect to detected obstacles during continued automatic motion of said autonomous device, and obtaining further proximity data for use by said microprocessor in combination with said data base for orientation and guidance of said autonomous device during said continued automatic motion by processing further digital signals transmitted from a number of said receivers to said microprocessor in response to further of said transmitting and detecting on the same wave frequency within said predetermined time slot during said continued automatic motion.

2. The method according to claim 1 including the further step of arranging at least some of said receivers differently in height in relation to the remaining receivers for improving three-dimensional resolution.

3. The method according to claim 1 including the further step of providing said autonomous device with an absorber above at least one receiver in the line of said receiver to attenuate undesired reflections from above and/or from the side, said absorber acting as an eyebrow above the receiver.

4. The method according to claim 1 further including the step of providing said autonomous device with a screen above at least one receiver in the line of said receiver to attenuate undesired reflections from above and/or from the side, said screen acting as an eyebrow above said receiver.

5. The method according to claim 1 wherein said wave comprises a longitudinal acoustic wave.

6. The method according to claim 1 wherein said wave comprises an acoustic wave having a frequency within the ultrasonic range.

7. The method according to claim 1 wherein said wave comprises one of a short, regularly repeated pulse and a repeated swept pulse (chirp signal).

8. The method according to claim 1 including the further step of arranging the most outer receiver on each side of a line of said receivers differently in height in relation to the remaining receivers.

9. The method according to claim 1 wherein said receivers comprise microphone elements adopted to the frequency of said wave.

10. A system for sensing proximity for an autonomous device, said autonomous device including wheels, a motor, and a microprocessor and proximity sensing system for orientation and guidance of said autonomous device, said proximity sensing system including at least a transmitter and a plurality of receivers, said receivers having signal interfaces for transmitting digital signals to said microprocessor and being arranged in one of a slanted plane and along a curved baseline for obtaining direction resolution to obstacles having reflected a wave of slow propagation, said transmitter being structured and arranged to transmit said wave, said wave having a slow propagation and being transmittable within a continuous sector of a normal travelling direction of said autonomous device; said receivers being structured and arranged to detect reflections of said wave during a predetermined time slot, corresponding to a proximate area, thereby obtaining a three-dimensional direction to an obstacle; said receivers further being structured and arranged to transmit digital signals from said receivers to said microprocessor in response to said reflections; said microprocessor being structured and arranged to process said digital signals and create an orientation data base within said proximate area which is utilized continuously for orientation and guidance of said autonomous device with respect to detected obstacles during continued automatic motion of said autonomous device, and which is used in combination with further proximity data for orientation and guidance of said autonomous device during said continued automatic motion by processing further digital signals transmitted from a number of said receivers to said microprocessor in response to further transmission and detection on the same wave frequency within said predetermined time slot during said continued automatic motion.

11. The system according to claim 10 wherein at least some of said receivers are arranged differently in height in relation to the remaining receivers for improving the three-dimensional resolution.

12. The system according to claim 10 wherein said autonomous device is provided with an absorber above at least one receiver in the line of said receivers, said absorber attenuating undesired reflections from above and/or from the side and then acts in the same manner as an eyebrow above said receivers.

13. The system according to claim 10 wherein said autonomous device is provided with a screen above at least one receiver in the line of said receivers, said screen attenuating undesired reflections from above and/or from the side and then acts in the same manner as an eyebrow above the receivers.

14. The system according to claim 10 wherein the most outer receivers on each side of the line of said receivers are arranged differently in height in relation to the remaining receivers.

15. The system according to claim 10 wherein said wave comprises a longitudinal acoustic wave.

16. The system according to claim 10 wherein said wave comprises an acoustic wave having a frequency within the ultrasonic range.

17. The system according to claim 10 wherein said wave comprises one of a short, regularly repeated pulse and a repeated swept pulse (chirp signal).

18. The system according to claim 10 wherein said receivers comprise microphone elements adopted to the frequency of said wave.

19. The method according to claim 2, wherein said autonomous device is provided with an absorber above at least one receiver in the line of said receiver to attenuate undesired reflections from above and/or from the side, said absorber acting as an eyebrow above the receiver.

20. The system according to claim 11 wherein said autonomous device is provided with an absorber above at least one receiver in the line of receiver, said absorber attenuating undesired reflections from above and/or from the side and then acts in the same manner as an eyebrow above the receiver.

* * * * *